(12) United States Patent
Hatambeiki et al.

(10) Patent No.: US 9,250,715 B2
(45) Date of Patent: *Feb. 2, 2016

(54) SYSTEM AND METHOD FOR ENHANCED COMMAND INPUT

(71) Applicant: UNIVERSAL ELECTRONICS INC., Santa Ana, CA (US)

(72) Inventors: Arsham Hatambeiki, Irvine, CA (US); Jeffrey Kohanek, Westminster, CA (US); Pamela Eichler Keiles, Long Beach, CA (US); Patrick H. Hayes, Mission Viejo, CA (US)

(73) Assignee: UNIVERSAL ELECTRONICS INC., Santa Ana, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 13/887,934

(22) Filed: May 6, 2013

(65) Prior Publication Data

US 2013/0241876 A1   Sep. 19, 2013

Related U.S. Application Data

(63) Continuation of application No. 12/552,761, filed on Sep. 2, 2009, now Pat. No. 8,438,503.

(51) Int. Cl.
| | |
|---|---|
| *G06F 3/033* | (2013.01) |
| *H04N 5/44* | (2011.01) |
| *H04N 5/445* | (2011.01) |
| *H04N 21/422* | (2011.01) |
| *G08C 17/02* | (2006.01) |
| *G06F 3/01* | (2006.01) |

(52) U.S. Cl.
CPC ............ *G06F 3/033* (2013.01); *G06F 3/017* (2013.01); *G08C 17/02* (2013.01); *H04N 5/4403* (2013.01); *H04N 5/44543* (2013.01); *H04N 21/42222* (2013.01); *H04N 21/42224* (2013.01); *H04N 2005/443* (2013.01); *H04N 2005/4428* (2013.01)

(58) Field of Classification Search
None
See application file for complete search history.

(56) References Cited

U.S. PATENT DOCUMENTS

| | | |
|---|---|---|
| 4,623,887 A | 11/1986 | Welles, II |
| 4,703,359 A | 10/1987 | Rumbolt et al. |
| 4,774,511 A | 9/1988 | Rumbolt et al. |
| 4,959,810 A | 9/1990 | Darbee et al. |
| 5,481,256 A | 1/1996 | Darbee et al. |
| 5,537,463 A | 7/1996 | Escobosa et al. |
| 5,545,857 A | 8/1996 | Lee et al. |
| 5,592,604 A | 1/1997 | Marusak |
| 5,614,906 A | 3/1997 | Hayes et al. |

(Continued)

OTHER PUBLICATIONS

Chinese Patent Office, Office Action issued on Chinese patent application No. 201080039211.6, dated Nov. 15, 2014, 3 pages.

(Continued)

*Primary Examiner* — Phenuel Salomon
(74) *Attorney, Agent, or Firm* — Greenberg Traurig, LLP

(57) ABSTRACT

A portable electronic device having an input device for receiving a gesture based input from a user is used to control a navigation operation of an appliance. The portable electronic device receives via the input device the gesture based input and uses one or more parameters stored in a memory of the portable electronic device and one or more characteristics associated with the gesture based input to cause the portable electronic device to transmit a navigation step command to thereby control the navigation operation of the appliance.

25 Claims, 5 Drawing Sheets

(56) References Cited

U.S. PATENT DOCUMENTS

| | | | |
|---|---|---|---|
| 5,640,160 | A | 6/1997 | Miwa |
| 5,872,562 | A | 2/1999 | McConnell et al. |
| 5,953,144 | A | 9/1999 | Darbee et al. |
| 5,959,751 | A | 9/1999 | Darbee et al. |
| 6,014,092 | A | 1/2000 | Darbee et al. |
| 6,127,941 | A * | 10/2000 | Van Ryzin ............ G08C 17/02 340/12.53 |
| 6,157,319 | A | 12/2000 | Johns et al. |
| 6,225,938 | B1 | 5/2001 | Hayes et al. |
| 6,396,523 | B1 | 5/2002 | Segal et al. |
| 6,437,836 | B1 | 8/2002 | Huang et al. |
| 6,629,077 | B1 | 9/2003 | Arling et al. |
| 6,678,891 | B1 | 1/2004 | Wilcox et al. |
| 6,765,557 | B1 | 7/2004 | Segal et al. |
| 6,867,764 | B2 | 3/2005 | Ludtke |
| 6,906,696 | B2 | 6/2005 | Allport |
| 6,914,551 | B2 | 7/2005 | Vidal |
| 7,167,913 | B2 | 1/2007 | Chambers |
| 7,236,156 | B2 | 6/2007 | Liberty et al. |
| 7,301,464 | B2 | 11/2007 | Coulter |
| 7,353,461 | B2 | 4/2008 | Davidsson et al. |
| 7,522,087 | B2 | 4/2009 | Shibamiya et al. |
| 7,631,278 | B2 * | 12/2009 | Miksovsky et al. ............ 715/857 |
| 7,768,421 | B2 * | 8/2010 | Suzuki et al. ............. 340/12.14 |
| 2002/0097229 | A1 * | 7/2002 | Rose et al. ................... 345/173 |
| 2004/0070491 | A1 | 4/2004 | Huang et al. |
| 2004/0140993 | A1 | 7/2004 | Geaghan et al. |
| 2005/0097478 | A1 | 5/2005 | Killian et al. |
| 2005/0102699 | A1 | 5/2005 | Kim et al. |
| 2005/0159823 | A1 * | 7/2005 | Hayes et al. .................... 700/19 |
| 2005/0190973 | A1 | 9/2005 | Kristensson et al. |
| 2005/0212911 | A1 | 9/2005 | Marvit et al. |
| 2006/0061551 | A1 | 3/2006 | Fateh |
| 2006/0071950 | A1 | 4/2006 | Kurzweil et al. |
| 2006/0227116 | A1 | 10/2006 | Zotov et al. |
| 2006/0253793 | A1 | 11/2006 | Zhai et al. |
| 2007/0037522 | A1 | 2/2007 | Liu et al. |
| 2007/0229465 | A1 | 10/2007 | Sakai et al. |
| 2008/0016467 | A1 | 1/2008 | Chambers et al. |
| 2008/0291163 | A1 | 11/2008 | Liberty et al. |
| 2009/0125811 | A1 | 5/2009 | Bethurum |
| 2009/0208057 | A1 | 8/2009 | Wilson et al. |
| 2010/0045490 | A1 * | 2/2010 | Odell ..................... H03M 11/14 341/22 |
| 2010/0141578 | A1 * | 6/2010 | Horiuchi ................. G06F 3/017 345/158 |
| 2010/0171635 | A1 * | 7/2010 | Chu ....................... G08C 17/02 340/12.22 |

OTHER PUBLICATIONS

USPTO, Office Action issued on U.S. Appl. No. 13/887,784, dated Nov. 19, 2014, 12 pages.

USPTO, Office Action issued on U.S. Appl. No. 13/887,964, dated Apr. 23, 2015, 11 pages.

USPTO, Office Action issued on U.S. Appl. No. 13/887,811, dated Jul. 31, 2014, 15 pages.

USPTO, Office Action issued on U.S. Appl. No. 13/887,811, dated Dec. 3, 2014, 14 pages.

* cited by examiner

SYSTEM AND METHOD FOR ENHANCED COMMAND INPUT

RELATED APPLICATION INFORMATION

This application claims the benefit of and is a continuation of U.S. application Ser. No. 12/552,761, filed on Sep. 2, 2009, the disclosure of which is incorporated herein by reference in its entirety.

BACKGROUND

Controlling devices, for example remote controls, for use in issuing commands to entertainment and other appliances, and the features and functionality provided by such controlling devices are well known in the art. Traditionally, user input means on such controlling devices has comprised a series of buttons each of which may result in the transmission of a specific command when activated. Increasingly in today's environment, such controlling devices must be used to interact with displayed menu systems, browse web pages, manipulate pointers, and perform other similar activities which may require movement, e.g., to scroll displayed information on a screen, to move a pointer, to control a game activity or avatar, to zoom in or out, to control functions such as fast forward or slow motion, or the like (such activities collectively referred to hereafter as "navigation"). Although control of navigation functions is possible using conventional controlling device input mechanisms, such as a group of up, down, left, and right arrow keys, in many instances the user experience may be improved by the provision of an input mechanism which is better suited to this type of activity. Additionally, in some cases the user experience may be further enhanced by providing for adjustment of various aspects of the navigation input system, such as sensitivity, speed, etc., according to personal preference.

SUMMARY OF THE INVENTION

In accordance with this and other needs, the following generally describes a system and method for providing improved navigation input functionality on a controlling device. To this end, in addition to a conventional key matrix for receiving button inputs as is well known in the art, a controlling device may be provided with navigation-specific input means such as for example a mechanical scroll wheel, resistive or capacitive touch sensor, etc., whereby motion and/or pressure by a user's finger may be translated into a repetitive series of step commands transmitted to a target controlled device. These commands may be applied at the target device to control navigation related operations, such as the scrolling of a menu, the movement of a cursor on the screen, the motion of a game object, etc., as appropriate for a particular application. The step repetition rate output by the controlling device may be variable dependent upon speed of motion and/or intensity of pressure, and may further include non-linear response factors such as acceleration/deceleration as well as virtual button sensing. The parameters controlling such response factors may be user adjustable to match individual preferences.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
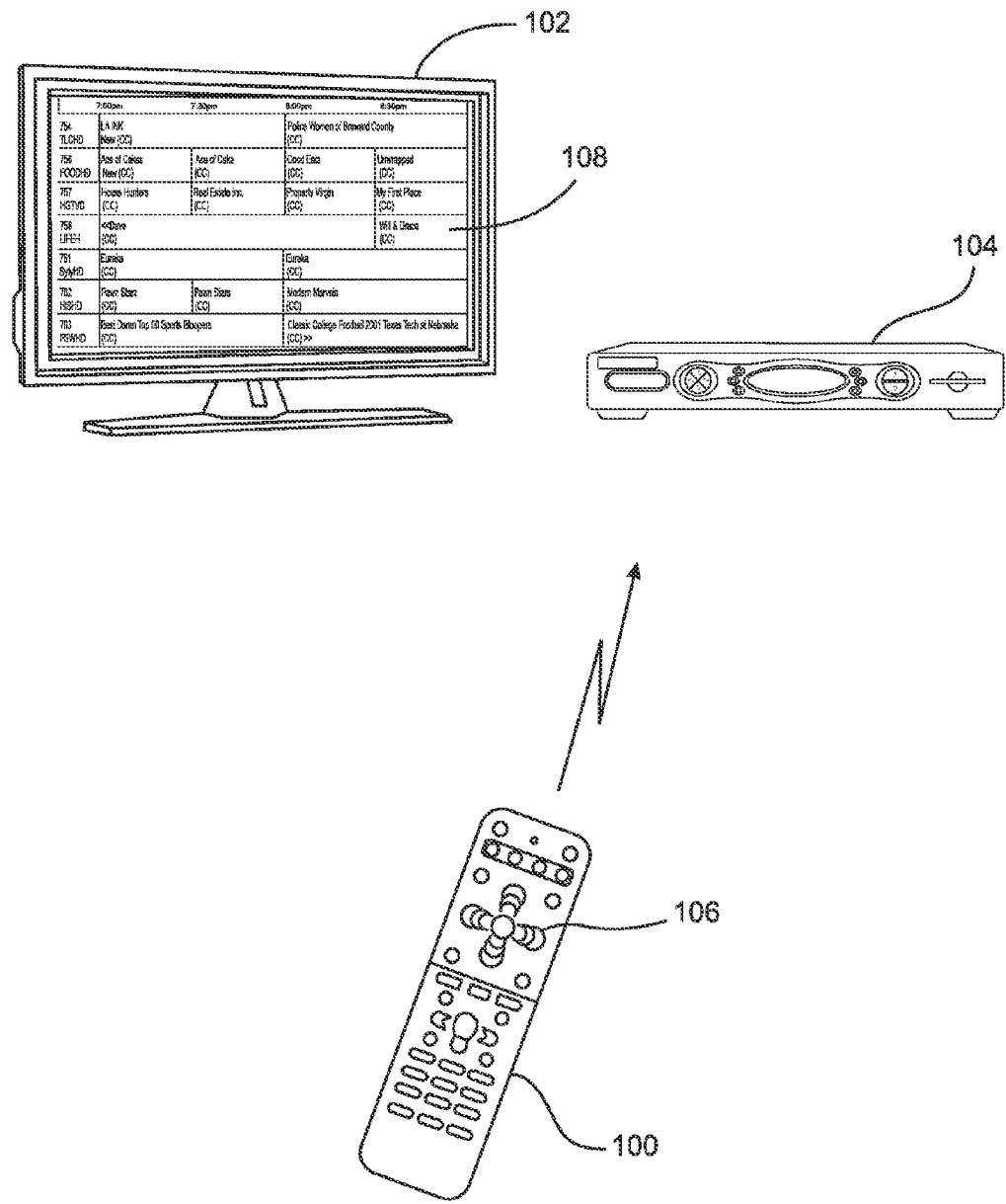
FIG. 1 illustrates an exemplary system in which an exemplary controlling device according to the instant invention may be used.

Turning now to FIG. 1, there is illustrated an exemplary system in which a controlling device 100 is configured to control various controllable appliances, such as a television 102 and a set top box ("STB") 104. As is known in the art, the controlling device 100 is capable of transmitting commands to the appliances, using any convenient IR, RF, Point-to-Point, or networked protocol, to cause the appliances to perform operational functions. While illustrated in the context of a television 102 and STB 104, it is to be understood that controllable appliances may include, but need not be limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. In a particular illustrative embodiment, in addition to conventional control functionality as is well know in the art, controlling device 100 may further include an input area 106 for generation of navigation commands for transmission from the controlling device 100 to one or more appliances in response to user interaction with that area, used for example to scroll a program guide menu display 108 on TV 102 by issuing a series of step commands to set top box 104 as will be described in further detail hereafter.

Figure 2:
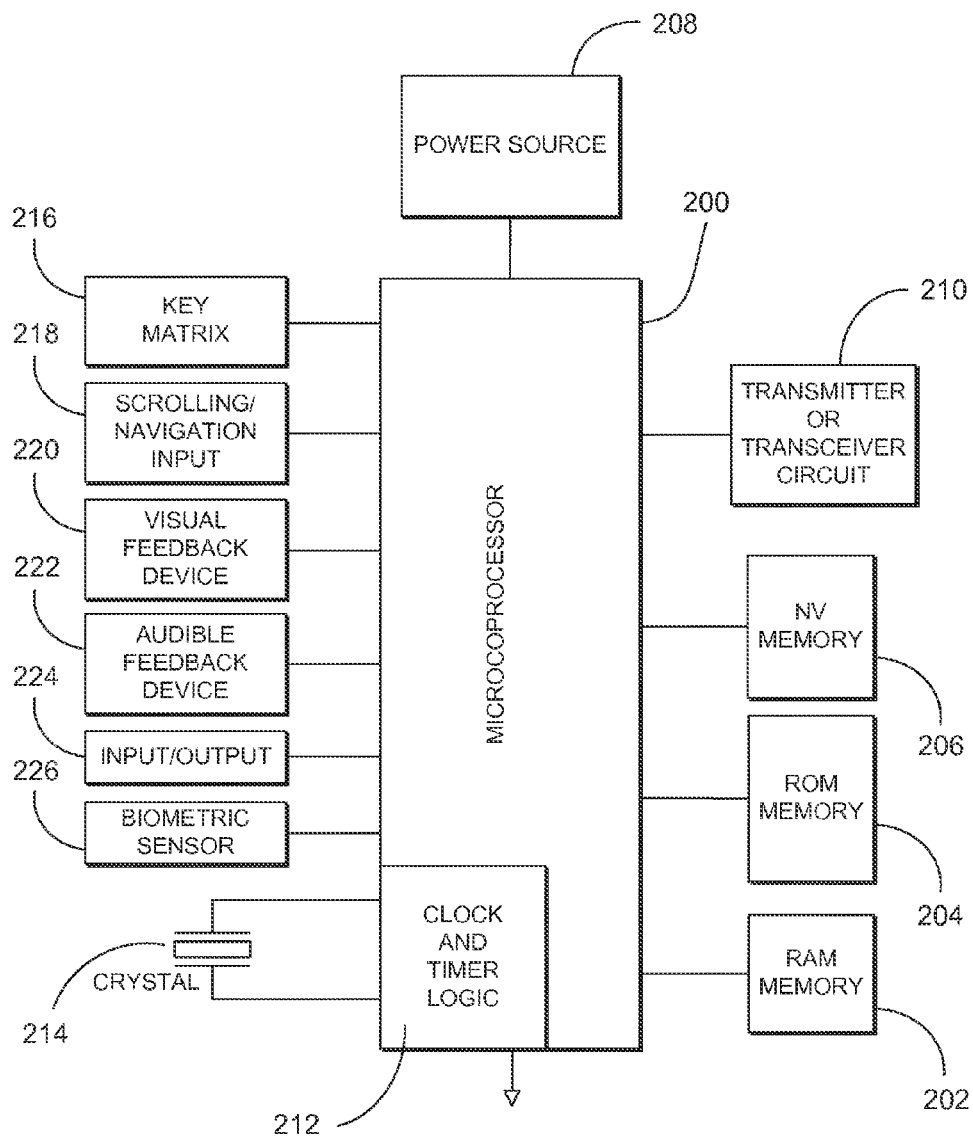
FIG. 2 illustrates a block diagram of exemplary components of the exemplary controlling device of FIG. 1.

With reference to FIG. 2, for use in commanding the functional operations of one or more appliances, the controlling device 100 may include, as needed for a particular application, a processor 200 coupled to a ROM memory 204; a RAM memory 202; a key matrix 216 (e.g., hard keys, soft keys such as a touch sensitive surface overlaid on a liquid crystal (LCD), and/or an electroluminescent (EL) display); a scrolling and/or navigation function input means 218 such as a capacitive or resistive touch sensor, scroll wheel, etc.; transmission circuit(s) and/or transceiver circuit(s) 210 (e.g., IR and/or RF); a non-volatile read/write memory 206; a means 220 to provide visual feedback to the user (e.g., one or more LEDs, display, and/or the like); a means 222 to provide audible feedback to a user (e.g., a speaker, piezoelectric buzzer, etc.); a power source 208; an input/output port 224 such as a serial interface, USB port, modem, Zigbee, WiFi, or Bluetooth transceiver, etc.; a biometric input device 226 such a fingerprint recognition pad, hand tremor detector, etc.; and clock and timer logic 212 with associated crystal or resonator 214.

As will be understood by those skilled in the art, some or all of the memories 202, 204, 206 may include executable instructions (collectively, the program memory) that are intended to be executed by the processor 200 to control the operation of the remote control 100, as well as data which serves to define to the operational software the necessary control protocols and command values for use in transmitting command signals to controllable appliances (collectively, the command data). In this manner, the processor 200 may be programmed to control the various electronic components within the remote control 100, e.g., to monitor the key matrix 216, to cause the transmission of signals, etc. The non-volatile read/write memory 206, for example an EEPROM, battery-backed up RAM, FLASH, Smart Card, memory stick, or the like, may additionally be provided to store setup data and parameters as necessary. While the memory 204 is illustrated and described as a ROM memory, memory 204 can also be comprised of any type of readable media, such as ROM, FLASH, EEPROM, or the like. Preferably, the memories 204 and 206 are non-volatile or battery-backed such that data is not required to be reloaded after battery changes. In addition, the memories 202, 204 and 206 may take the form of a chip, a hard disk, a magnetic disk, an optical disk, and/or the like. Still further, it will be appreciated that some or all of the illustrated memory devices may be physically combined (for example, a single FLASH memory may be logically partitioned into different portions to support the functionality of memories 204 and 206 respectively), and/or may be physically incorporated within the same IC chip as the microprocessor 200 (a so called "microcontroller") and, as such, they are shown separately in FIG. 2 only for the sake of clarity.

To cause the controlling device 100 to perform an action, the controlling device 100 is adapted to be responsive to events, such as a sensed user interaction with the key matrix 216, etc. In response to an event, appropriate instructions within the program memory (hereafter the "operating program") may be executed. For example, when a function key is actuated on the controlling device 100, the controlling device 100 may retrieve from the command data stored in memory 202, 204, 206 a command value and control protocol corresponding to the actuated function key and, where necessary, current device mode and will use the retrieved command data to transmit to an intended target appliance, e.g., STB 104, a command in a format recognizable by that appliance to thereby control one or more functional operations of that appliance. It will be appreciated that the operating program can be used not only to cause the transmission of commands and/or data to the appliances, but also to perform local operations. While not limiting, local operations that may be performed by the controlling device 100 may include displaying information/data, favorite channel setup, macro key setup, function key relocation, etc. Examples of local operations can be found in U.S. Pat. Nos. 5,481,256, 5,959,751, and 6,014,092.

In some embodiments, controlling device 100 may be the universal type, that is provisioned with a library comprising a multiplicity of command codes and protocols suitable for controlling various appliances. In such cases, for selecting sets of command data to be associated with the specific appliances to be controlled (hereafter referred to as a setup procedure), data may be entered into the controlling device 100 that serves to identify each intended target appliance by its make, and/or model, and/or type. The data may typically be entered via activation of those keys that are also used to cause the transmission of commands to an appliance, preferably the keys that are labeled with numerals. Such data allows the controlling device 100 to identify the appropriate command data set within the library of command data that is to be used to transmit recognizable commands in formats appropriate for such identified appliances. The library of command data may represent a plurality of controllable appliances of different types and manufacture, a plurality of controllable appliances of the same type but different manufacture, a plurality of appliances of the same manufacture but different type or model, etc., or any combination thereof as appropriate for a given embodiment. In conventional practice as is well known in the art, such data used to identify an appropriate command data set may take the form of a numeric setup code (obtained, for example, from a printed list of manufacturer names and/or models with corresponding code numbers, from a support Web site, etc.). Alternative setup procedures known in the art include scanning bar codes, sequentially transmitting a predetermined command in different formats until a target appliance response is detected, interaction with a Web site culminating in downloading of command data and/or setup codes to the controlling device, etc. Since such methods for setting up a controlling device to command the operation of specific home appliances are well-known, these will not be described in greater detail herein. Nevertheless, for additional information pertaining to setup procedures, the reader may turn, for example, to U.S. Pat. Nos. 4,959,810, 5,614,906, or 6,225,938 all of like assignee and incorporated herein by reference in their entirety.

Figure 3:
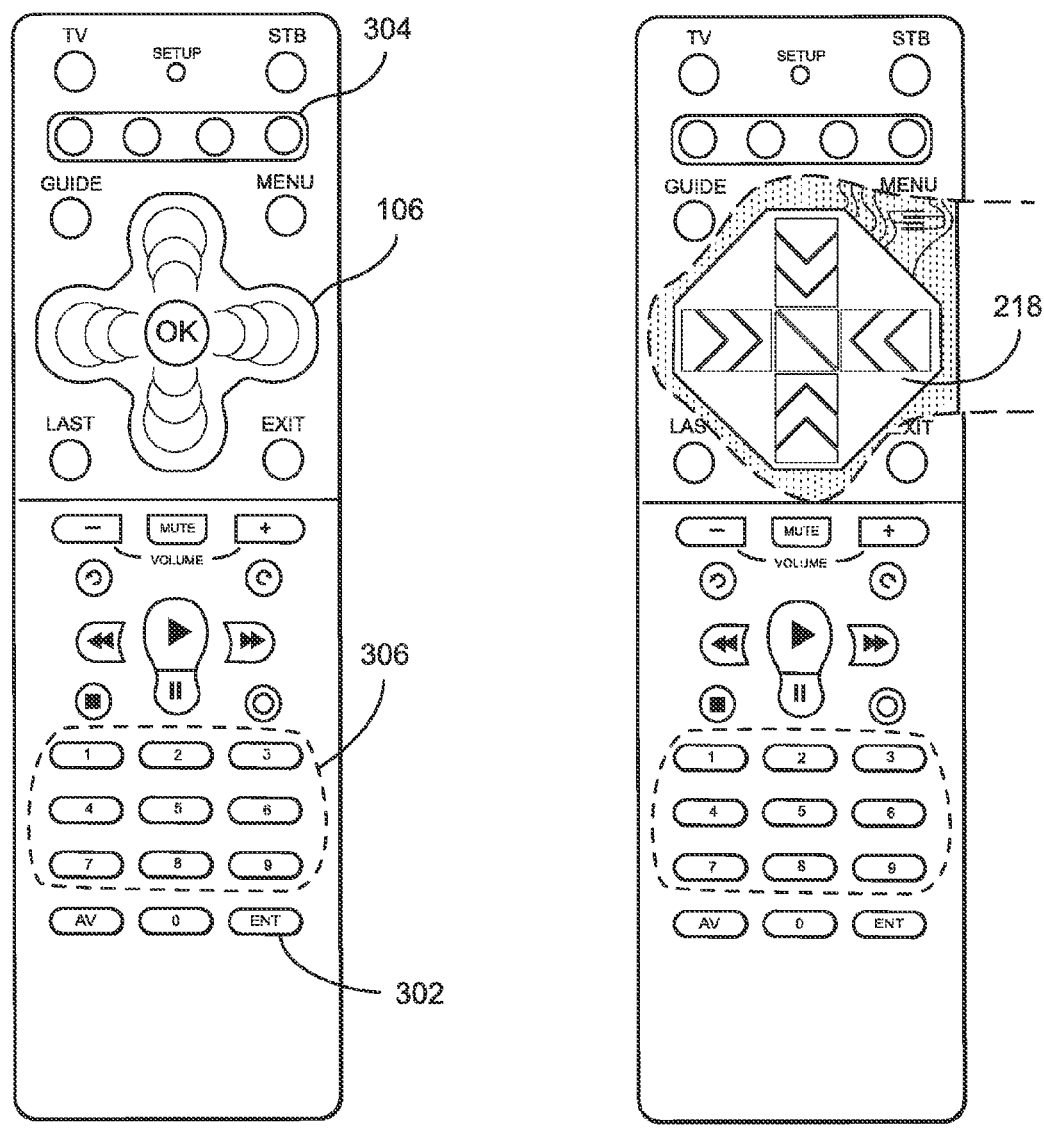
FIG. 3 further illustrates the exemplary controlling device of FIG. 1.
Figure 5:
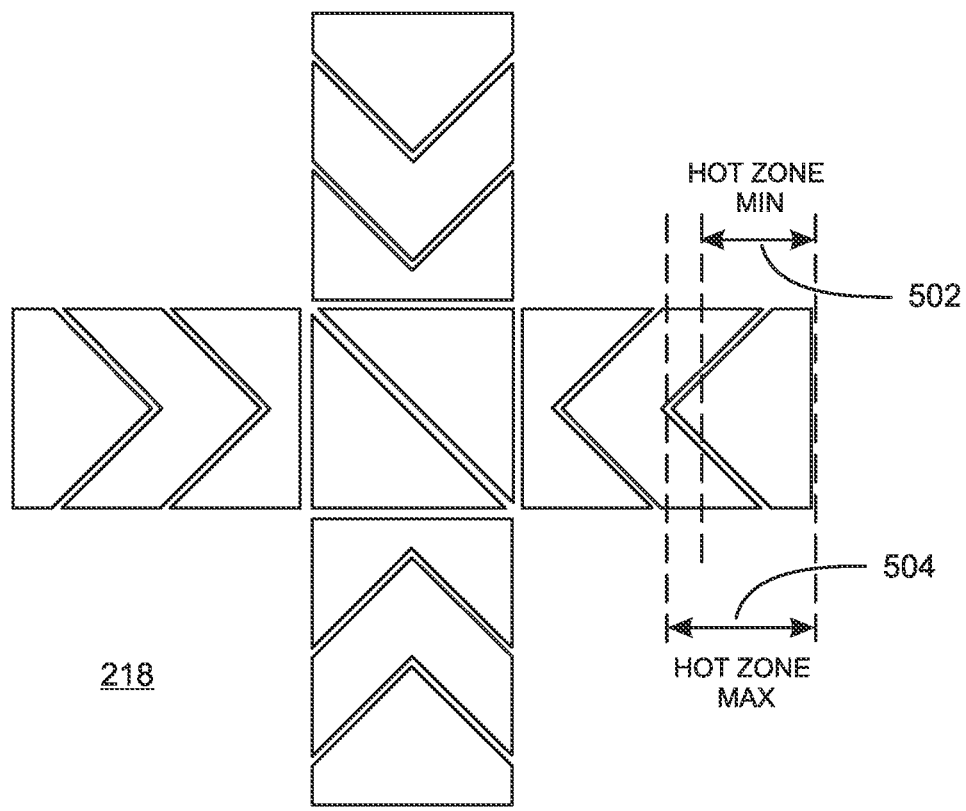
FIG. 5 illustrates the definition of an exemplary virtual button press zone for the navigation input sensing area of an exemplary controlling device.

In keeping with the teachings of this invention, controlling device 100 may also include an input device for accepting user touch input to be translated into navigation commands. In an exemplary embodiment, the input device 218 may take the form of a two-axis multiple-electrode capacitive touch sensor as illustrated in FIGS. 3 and 5. In this form, input device 218 may accept finger sliding gestures on either axis for translation into navigation step commands in an X or Y direction, as well as finger taps at the cardinal points and center area for translation into discrete commands, for example, equivalent to a conventional keypad's four arrow keys and a select key, all as will be described in further detail hereafter. It will however be appreciated that any other suitable technology, electrical, mechanical or a combination thereof may be used to implement the teachings of this invention, and accordingly the methods described may be applied regardless of the physical input means employed by a particular embodiment.

Figure 4:
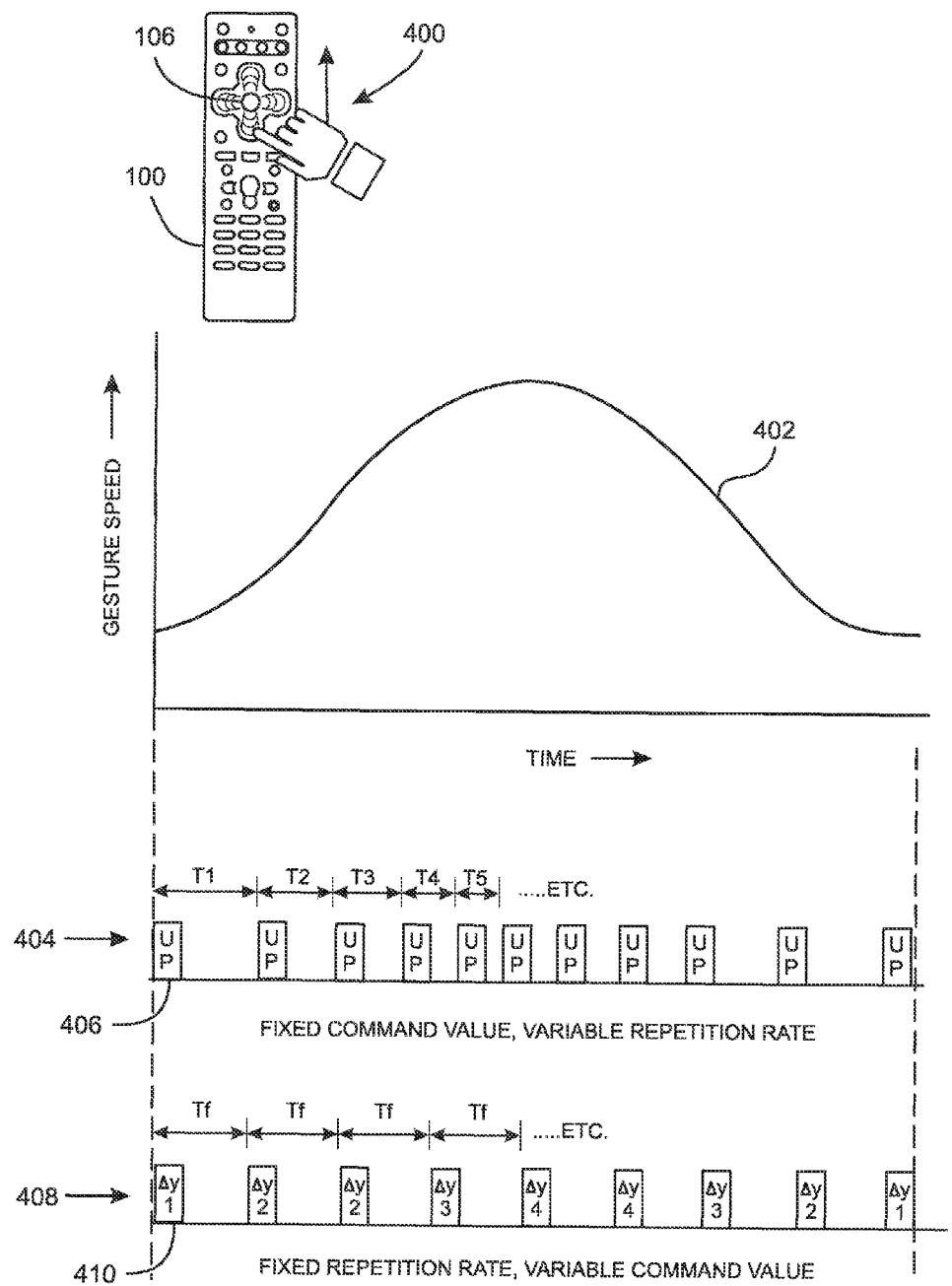
FIG. 4 illustrates exemplary methods for reporting navigation step functions from a controlling device to a target appliance.

Navigation step commands resulting from finger sliding gestures may be reported to a target appliance using any convenient transmission protocol, IR or RF, as known in the art. In general, such reports may include information representative of both direction and speed of the input gesture. By way of example, without limitation, two possible methods of formatting such a report transmission are illustrated in FIG. 4 for an exemplary gesture 400, in an upward direction on the Y-axis of a navigation input area 106 of an exemplary controlling device 100 and with a speed/time profile as illustrated by curve 402. In one exemplary embodiment, navigation step commands may be reported as illustrated at 404, comprising a transmission of a sequence of navigation direction commands (for example an "'up' command" 406) where the navigation direction command is repeated a variable number of times at a variable rate (T1, T2, T3, T4, etc.) which is determined as a function of, for example, the current speed of gesture 400 and one or more of the stored parameters. In another exemplary embodiment, navigation step commands may be reported as illustrated at 408, comprising a transmission of a sequence of variable direction delta values 410 (for example, "delta Y"=1, 2, 3, 4 etc.) where the direction delta values are transmitted at fixed intervals Tf and wherein the delta values are determined as a function of, for example, the current speed of gesture 400 and one or more of the stored parameters. In general, any suitable transmission protocol and reporting method may be used as appropriate to the target appliance to be controlled. It will be further appreciated that in certain embodiments where controlling device 100 is of the universal type, more than one method of reporting navigation step commands may be supported by controlling device 100 and selected dependent on the target device currently configured. Since the methods for formatting and encoding command transmission packets are well known in the art, for the sake of brevity these will not be described further herein. However, for additional information regarding formats and encoding schemes, the interested reader my turn to, for example, U.S. Pat. Nos. 7,167,913 or 5,640,160 both of are incorporated herein by reference in their entirety.

To adapt the characteristics of the navigation input device 218 used to the requirements of the appliance to be controlled, in most embodiments a translation is required from the physical input parameters received from navigation input device 218 to a logical number of steps to be transmitted to the target device, for example STB 104. This logical step value may be dependent both on a cumulative distance value of an input gesture and the speed that gesture. By way of further example, different navigation input devices may have different physical resolutions; i.e., a complete path such as an end-to-end finger swipe, full wheel rotation, maximum electrical impedance swing, etc., may be translated into a different number of physical steps. This physical resolution must be mapped to a logical number of steps which correspond to a desired range of commands to be issued to a target device. By way of example, if a navigation input device such as 218 reports 256 increments end-to-end on its X-axis and the X axis slider input is to be mapped to 8 logical steps, then each 32 steps of physical movement on the illustrative slider may be translated to 1 logical step to be reported to the target. In general for linear, non-accelerated behavior this may be represented as:

$$STEP\text{-}D = int(PHY\text{-}D * STEP\text{-}MAX/PHY\text{-}MAX)$$

Where
STEP-D: number of logical steps to be reported to the target for a PHY-D movement
PHY-D: raw delta physical movement reported by the input device
PHY-MAX: maximum resolution of the input device.
STEP-MAX: number of logical steps to be reported for a maximum physical movement.

In certain embodiments the physical movements may be calculated cumulatively; i.e., at some sample rates a movement may not be enough to generate a logical step report to the target, however through more sample periods the cumulative distance may reach the threshold of a logical step and be reported to the target at that time. Also in some instances a "carry-over" behavior may be required to assure natural translation of physical movements to logical steps. In such cases a PHY-CR parameter, representative of carry over physical movement from previous steps not yet applied towards a logical step may be added as follows:

$$STEP\text{-}D = int((PHY\text{-}CR + PHY\text{-}D)/(PHY\text{-}MAX/STEP\text{-}MAX))$$

$$\text{where } PHY\text{-}CR = (PHY\text{-}CR + PHY\text{-}D) mod (PHY\text{-}MAX/STEP\text{-}MAX)$$

In addition, in certain embodiments an acceleration coefficient may be applied to the raw data provided by the input device, based on the speed of interaction. Such an acceleration coefficient may be derived, for example, as follows:

$$ACC\text{-}COEFF = (PHY\text{-}D * T\text{-}MAX)/(T\text{-}D * PHY\text{-}MAX)$$

$$\text{If } (ACC\text{-}COEFF < 1 \lor Acceleration = Disabled) \text{ then } ACC\text{-}COEFF = 1$$

Where
T-MAX: A baseline number of sample periods to travel the PHY-MAX distance on the input device, i.e., the highest rate of user input which should result in linear step data output with no acceleration.
T-D: Sample periods elapsed to travel PHY-D.
ACC-COEFF: The acceleration coefficient to be applied to raw physical data for a non-linear experience. The value of this coefficient is always >=1. (When equal to 1, acceleration is disabled)

This acceleration coefficient parameter may then be used to adjust the PHY-D value presented in the previous equations, for example:

$$STEP\text{-}D = (PHY\text{-}CR + PHY\text{-}D * ACC\text{-}COEFF)/(PHY\text{-}MAX/STEP\text{-}MAX)$$

$$PHY\text{-}CR = (PHY\text{-}CR + PHY\text{-}D * ACC\text{-}COEFF) mod (PHY\text{-}MAX/STEP\text{-}MAX)$$

In certain embodiments, a user option may be provided to permanently set the acceleration coefficient to unity, i.e., always provide a linear output response regardless of speed of user gesture.

Such accelerated browsing behavior may only remain in effect for as long as a user's finger is present on the input device. Upon lifting the finger off of the input device, command output may come to a hard stop immediately with no further step commands transmitted to the target, or the command output may naturally decelerate through time, i.e., simulating a freewheeling "virtual wheel", based upon the speed at the point when the finger was lifted off the interface and a deceleration coefficient. In certain embodiments, the type of behavior and/or the deceleration coefficient to be applied may be user-configurable options. By way of further example, in an exemplary embodiment a configurable parameter DEC-COEFF may be defined to be applied to the speed of the virtual wheel to slowly decrease and finally bring it a natural stop. In one embodiment, the range of DEC-COEFF may be 0 to 0.99, where 0 will result an immediate stop. After finger lift-off, this deceleration coefficient may be iteratively applied as follows to produce a graduated decay in the value of PHY-D over time:

$$PHY\text{-}AVE = DEC\text{-}COEFF * PHY\text{-}AVE$$

$$PHY\text{-}D = PHY\text{-}AVE$$

where the initial value of PHY-AVE is the average physical movement in the last n sample periods before the finger was lifted off of the input device; where n will be >=1. The actual number of periods DEC-n to be used may be adjusted as an additional optimization step to assure a realistic experience. Further, in certain embodiments the natural behavior of a virtual wheel is taken into consideration in implementing this freewheeling feature. For example, the virtual wheel may be brought to a hard stop as soon as a finger is placed back on the input device, by immediately simulating a "DEC-COEFF=0" state if this event occurs. Other behaviors are also contemplated in various embodiments of this invention, for example a short finger tap on the input device may result in a temporary decrease in deceleration coefficient DEC-COEFF thus causing a more rapid slowing of the output.

It will be appreciated that in certain embodiments, the scrolling and navigation input device selected for use may already include built-in provision for support of non-linear ballistic or inertial response such as acceleration, freewheeling decay rate, etc., such as for example the SO3G2010 sensor module available from Synaptics Inc. of Santa Clara, Calif., and in such instances those features may be used in place or in conjunction with some or all of the methods described above. Accordingly, it is to be understood that that the methods described above are presented herein by way of illustration only and are not intended to be limiting.

In some embodiments, the navigation input device may also be required to decode finger taps by a user as virtual button presses for the generation of individual commands. To this end, the central crossing point and the far ends of each of the axes may be designated as button areas in which the type of user interaction will determine of the input is to be interpreted as part of a finger slide or as a button press. As illustrated in FIG. 5, the portion of each axis so designated may be defined by a pair of parameters HotZoneMin 502 and HotZoneMax 504, applied as described hereafter. It will be appreciated that in general the areas defined by these parameters are present at all four cardinal points and the central portion of the illustrative navigation input device, however for clarity only one such area is illustrated in FIG. 5. To avoid reporting unintended button presses without introducing cumbersome delays in the interaction model, an exemplary set of interpretation rules may comprise:

1. In freewheeling mode (i.e., when processing PHY-D decay according to the current DEC-COEFF), any touch on the interface is interpreted as a hard stop, regardless of location, and evaluated thereafter as a possible start of a sliding action.
2. If not in freewheeling mode, any initial contact within a defined HotZoneMin will be evaluated as a candidate for a button press.
3. In order to be interpreted as a button press, one of the following events should occur after the initial contact within a HotZoneMin area:
    The finger is not moved outside of HotZoneMax (which in a preferred embodiment may be slightly larger than HotZoneMin) within the amount of time specified by a VirtualButtonDelay parameter; or
    The finger is lifted off the interface without moving outside of HotZoneMax.
4. If the finger is moved outside of HotZoneMax before VirtualButtonDelay has elapsed, the input may be processed as the start of a finger slide.

To provide user feedback during input various visible or audible signals may be used, for example flashing visual feedback device 220 such as an LED or providing clicking or buzzing sounds using audible feedback device 222. In some embodiments, the feedback rate may be proportional to the rate at which step commands are being issued to the target device. Additionally, in some embodiments such feedback may be a user selectable option.

As will appreciated the user-perceived behavior, responsiveness, etc., of such gesture based navigation input devices may be dependent on multiple parameters such as for example, with reference to the foregoing illustrative embodiment:

Baseline traverse time below which acceleration is not triggered (T-MAX).
Deceleration coefficient (DEC-COEFF)
Deceleration measurement window (DEC-n)
Virtual button press area (HotZoneMin, HotZoneMax)
Virtual button press sensitivity (VirtualButtonDelay)

Further, certain features may be enabled/disabled according to personal preference, for example acceleration, freewheeling, visual/audible feedback, etc. As will be appreciated, for a given embodiment the optimum values of these parameters may vary from user to user. For example, an experienced "power user" may prefer a highly sensitive input system characterized for example by a low baseline for triggering acceleration and/or a high deceleration coefficient (slow freewheeling decay) together with high button press sensitivity; while a beginning user may be more comfortable with a little or no acceleration coupled with rapid deceleration and low button press sensitivity.

Accordingly, in a preferred embodiment some or all of the these parameters may be adjustable and stored in the non-volatile memory 206 of controlling device 100. In this manner, each individual controlling device may be tailored to match the preferences of the primary user of that device. To cater for multiple users of a single equipment configuration 102, 104, for example occupants of a single household, multiple controlling devices 100 may be provisioned such that each may be configured to a particular individual's preferences. In an alternate embodiment, a single controlling device may be adapted to store multiple sets of user selectable parameters. In such instances, the current user may for example identify themselves to controlling device via actuation of one of set of user buttons 304. Alternatively, in embodiments where controlling device 100 is equipped with a biometric sensor 226, user identification may be performed automatically. By way of example biometric sensor device 226 may comprise a fingerprint input pad as contemplated in U.S. Pat. No. 6,906,696 "Method of controlling multi-user access to the functionality of consumer devices", or an accelerometer for recognition of individual user hand tremor characteristics as contemplated in U.S. Pat. No. 7,236,156 "Methods and devices for identifying users based on tremor", both of which are incorporated herein by reference in their entirety.

By way of further example, an exemplary controlling device may support user-configurable navigation input parameters of the type and range shown in Table 1 below. Initially set to the default values shown, each of these parameters may be adjusted by a user to their personal preference by, for example, initiating a parameter setup mode via simultaneously holding down the "enter" key 302 together with a numeric key 306 corresponding to the item number to be adjusted until an audible beep indicates that the parameter setup mode has been initiated. Once in parameter setup mode, a numeric value between one and four digits (depending on the parameter being adjusted) may be entered for storage in non-volatile memory 206, after which that value be used in all future navigation input decoding and calculations. It will be appreciated that in embodiments which support multiple users, the adjusted values may be stored into an area of non-volatile memory assigned to the current user as previously identified, for example, by the activation of one of the user selection buttons 304.

TABLE 1

| Item | Description | Value range Min | Value range Max | Default |
|------|-------------|-----|-----|---------|
| 1 | Acceleration | 0 = disable | 1 = enable | 1 |
| 2 | Deceleration | 0 = disable | 1 = enable | 1 |
| 3 | Audible feedback | 0 = disable | 1 = enable | 1 |
| 4 | Basic traverse time (T-MAX) (mS) | 100 | 9999 | 500 |
| 5 | Deceleration coefficient (DEC-COEFF) | 1 | 99 | 75 |
| 6 | Decel. measurement window (DEC-n) (mS) | 25 | 500 | 50 |
| 7 | HotZoneMin (increments) | 16 | 128 | 32 |
| 8 | HotZoneMax (increments) | HotZoneMin | 128 | 48 |
| 9 | Hot zone dwell (VirtualButtonDelay) (mS) | 200 | 2000 | 500 |

It will be appreciated that while the above presented exemplary embodiment utilizes user keypad entries to accomplish parameter settings, various other methods may be used equally effectively where appropriate. For example, a user may configure the parameters using a PC application, local or internet-based, and then download the resulting values into the controlling device using known methods such as described for example in U.S. Pat. Nos. 5,953,144 or 5,537,463 both of like assignee and incorporated by reference herein in their entirety. Alternatively, in embodiments where a controlling device is equipped for two-way IR or RF communication with, for example, set top box 104, parameter adjustments may be accomplished using an interactive STB application and transferred to the controlling device via said two-way communication link. Further, in both of the above cases selection of parameter values may be accomplished interactively via experimentation—for example a specially designed PC or STB application may allow the user to interact with an exemplary screen display in a calibration mode with the controlling device parameters all at their default values, and automatically determine the optimum adjustments for that user based upon observed metrics such as reaction time, positing accuracy, speed of input gestures, etc.

In certain embodiments in which controlling device 100 is adapted to support two-way communication with a target appliance such as STB 104, additional refinements to parameter values may be implemented. For example, in place of or as a supplement to the above mentioned calibration mode, a target appliance may monitor a user's interactions and make dynamic, adaptive adjustments to the parameters stored in the controlling device via the two-way link. By way of example, if a user is observed to consistently overshoot when scrolling a program guide display, the acceleration and/or deceleration coefficients may be automatically adjusted by the STB application to improve the user experience. In yet another embodiment, a controlling device may store multiple parameter sets corresponding to various activities, for example one set optimized for menu navigation and another set optimized for game playing, with the parameter set currently in use being selected by the STB based on the current activity being performed. Alternatively, only a single set of base parameters may stored, and an activity related scaling factor supplied by the STB.

In some contemplated embodiments, not all parameters may necessarily be revealed to a user of the controlling device and made available for adjustment. For example, for the sake of simplicity certain parameter values may be determined by the manufacturer or supplier of the controlling device, based for example on the application and/or target appliance with which the controlling device is intended to be used, and preset at time of manufacture or installation.

While various concepts have been described in detail, it will be appreciated by those skilled in the art that various modifications and alternatives to those concepts could be developed in light of the overall teachings of the disclosure.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for using a device to control a navigation operation of an appliance, comprising:
   receiving raw data indicative of at least one characteristic associated with a gesture based input provided to an input device; and
   using the received raw data indicative of the at least one characteristic associated with the gesture based input and at least an acceleration coefficient parameter and a deceleration coefficient parameter to generate a navigation step command wherein the generated navigation step command is used to control the navigation operation of the appliance.

2. The method as recited in claim 1, wherein the navigation step command comprises a sequence of direction commands wherein a number of direction commands in the sequence is determined as a function of the at least one characteristics associated with the gesture based input and at least the acceleration coefficient parameter and the deceleration coefficient parameter.

3. The method as recited in claim 2, wherein the sequence of direction commands has a timing that is determined as a function of the at least one characteristic associated with the gesture based input and at least the acceleration coefficient parameter and the deceleration coefficient parameter.

4. The method as recited in claim 1, wherein the navigation step command comprises a sequence of direction delta values wherein the sequence of direction delta values is determined as a function of the at least one characteristic associated with the gesture based input and at least the acceleration coefficient parameter and the deceleration coefficient parameter.

5. The method as recited in claim 1, comprising establishing at least the acceleration coefficient parameter and the deceleration coefficient parameter at a device receiving the gesture based input.

6. The method as recited in claim 1, comprising establishing at least the acceleration coefficient parameter and the deceleration coefficient parameter at the appliance.

7. The method as recited in claim 1, comprising retrieving at least the acceleration coefficient parameter and the deceleration coefficient parameter from a server device.

8. The method as recited in claim 1, comprising dynamically changing at least the acceleration coefficient parameter and the deceleration coefficient parameter.

9. The method as recited in claim 1, wherein the input device comprises a touch sensitive surface.

10. The method as recited in claim 9, wherein the touch sensitive surface comprises a two-axis, capacitive touch sensor.

11. The method as recited in claim 1, comprising causing the appliance to perform an action in response to a second gesture based input being provided to the input device wherein the second gesture based input comprises a sensed tapping gesture upon the input device.

12. The method as recited in claim 11, wherein one or more regions of the input device are predetermined for receiving the tapping gesture.

13. The method as recited in claim 1, comprising providing user feedback representative of the gesture based input.

14. The method as recited in claim 13, wherein the user feedback comprises a series of audible sounds representative of the gesture based input.

15. A method for using a portable electronic device, having an input device for receiving a gesture based input from a user, to control a navigation operation of an appliance, comprising:
    receiving via the input device of the portable electronic device the gesture based input;
    causing the portable electronic device to transmit to the appliance raw data indicative of at least one characteristic associated with a gesture based input provided to the input device; and
    using at the appliance the received raw data indicative of the at least one characteristic associated with the gesture based input and at least an acceleration coefficient parameter and a deceleration coefficient parameter stored within a memory of the appliance to generate a navigation step command wherein the generated navigation step command is used by the appliance to control the navigation operation of the appliance.

16. The method as recited in claim 15, wherein the navigation step command generated by the appliance comprises a sequence of direction commands wherein a number of direction commands in the sequence is determined as a function of the at least one characteristics associated with the gesture based input and at least the acceleration coefficient parameter and the deceleration coefficient parameter.

17. The method as recited in claim 16, wherein the sequence of direction commands has a timing that is determined as a function of the at least one characteristic associated with the gesture based input and at least the acceleration coefficient parameter and the deceleration coefficient parameter.

18. The method as recited in claim 15, wherein the navigation step command generated by the appliance comprises a sequence of direction delta values wherein the sequence of direction delta values is determined as a function of the at least one characteristic associated with the gesture based input and at least the acceleration coefficient parameter and the deceleration coefficient parameter.

19. The method as recited in claim 15, comprising receiving at the appliance data for changing at least one of the acceleration coefficient parameter and the deceleration coefficient parameter.

20. The method as recited in claim 15, wherein at least the acceleration coefficient parameter and the deceleration coefficient parameter stored in the appliance is retrieved from a server device.

21. The method as recited in claim 15, comprising dynamically changing at least the acceleration coefficient parameter and the deceleration coefficient parameter.

22. The method as recited in claim 15, wherein the input device comprises a touch sensitive surface.

23. The method as recited in claim 22, wherein the touch sensitive surface comprises a two-axis, capacitive touch sensor.

24. The method as recited in claim 15, comprising receiving at the appliance from the portable electronic device data indicative of a sensed tapping gesture made upon the input device and causing the appliance to perform an action in response to the received data indicative of the sensed tapping gesture made upon the input device.

25. The method as recited in claim 24, wherein one or more regions of the input device are predetermined for receiving the tapping gesture.

* * * * *